United States Patent [19]

Reicher et al.

[11] 4,220,300
[45] Sep. 2, 1980

[54] THERMAL MONITOR FOR RAILROAD WHEELS

[75] Inventors: Harold J. Reicher, Westmont, Ill.; Leslie M. Hepler, Arnold, Md.

[73] Assignee: AMSTED Industries Incorporated, Chicago, Ill.

[21] Appl. No.: 42,520

[22] Filed: May 25, 1979

[51] Int. Cl.² ............... B61K 9/12; G01K 11/06
[52] U.S. Cl. .................. 246/169 A; 73/358; 116/217; 246/DIG. 2
[58] Field of Search ............. 73/358; 116/217; 246/169 A, 169 R, 169 D, DIG. 2

[56] References Cited

U.S. PATENT DOCUMENTS

| 2,230,047 | 1/1941 | Eastburg | 73/358 |
| 2,501,715 | 3/1950 | Ferguson | 116/217 X |
| 2,503,593 | 4/1950 | Pearce et al. | 73/358 |
| 2,924,083 | 2/1960 | Spase | 73/358 X |
| 2,924,975 | 2/1960 | Vernet | 73/358 |
| 3,290,942 | 12/1966 | Carbaugh et al. | 73/358 |
| 3,442,249 | 5/1969 | Jamison et al. | 116/217 |
| 3,802,269 | 4/1974 | Cooper | 73/356 |

Primary Examiner—Daniel M. Yasich
Attorney, Agent, or Firm—Edward J. Brosius; Fred P. Kostka; John L. Schmitt

[57] ABSTRACT

An apparatus for the thermal monitoring of railway wheels is provided. The monitor comprises an insert placed into the railway wheel near its rim. If the wheel overheats, the monitor will be released from its location. A subsequent inspection will readily indicate that the wheel has been overheated during operation.

3 Claims, 5 Drawing Figures

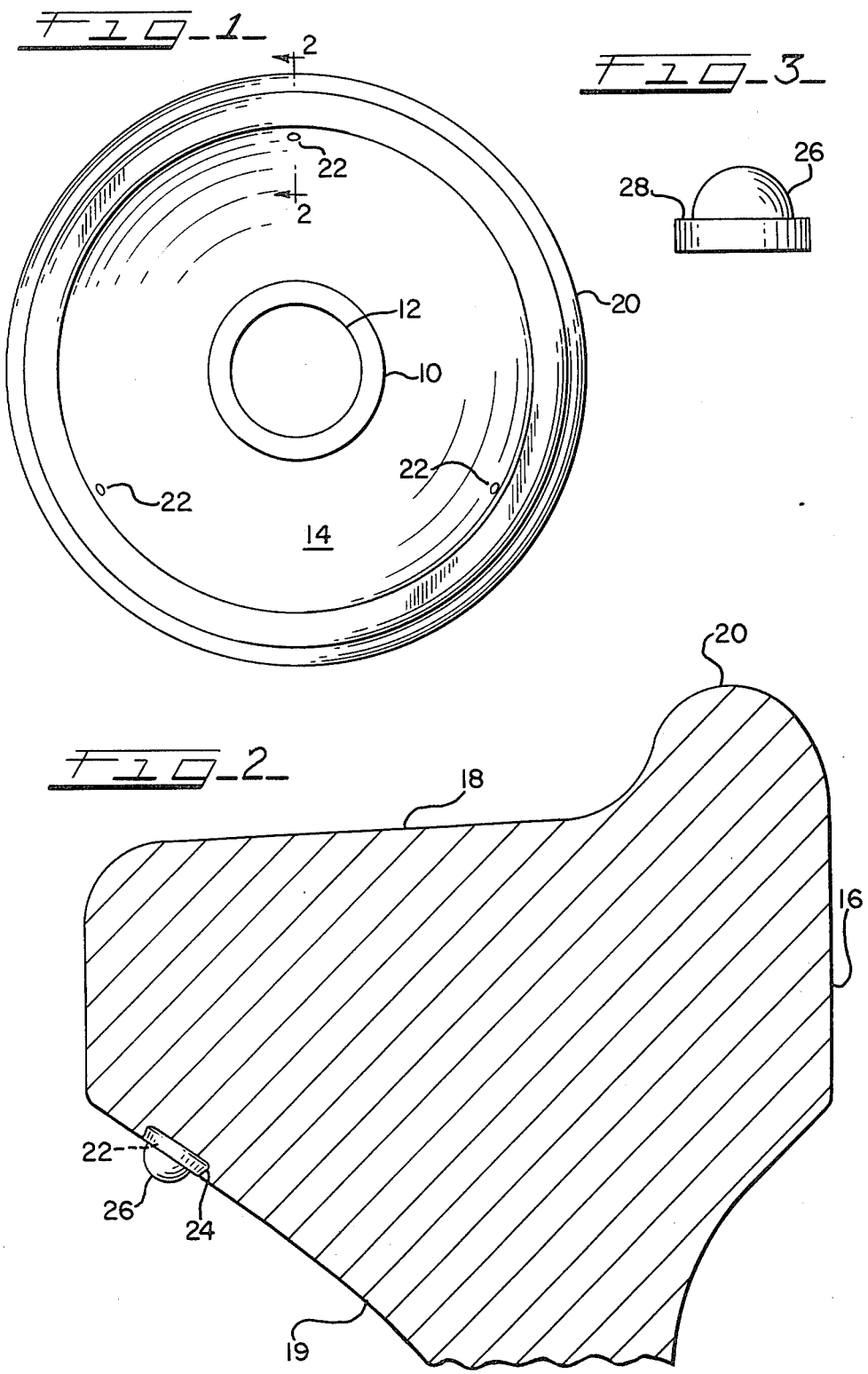

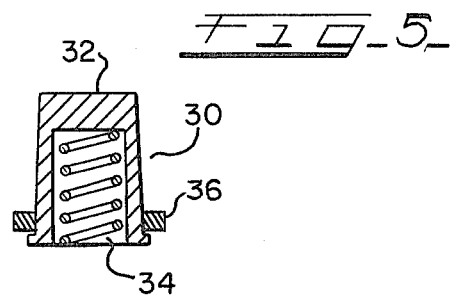
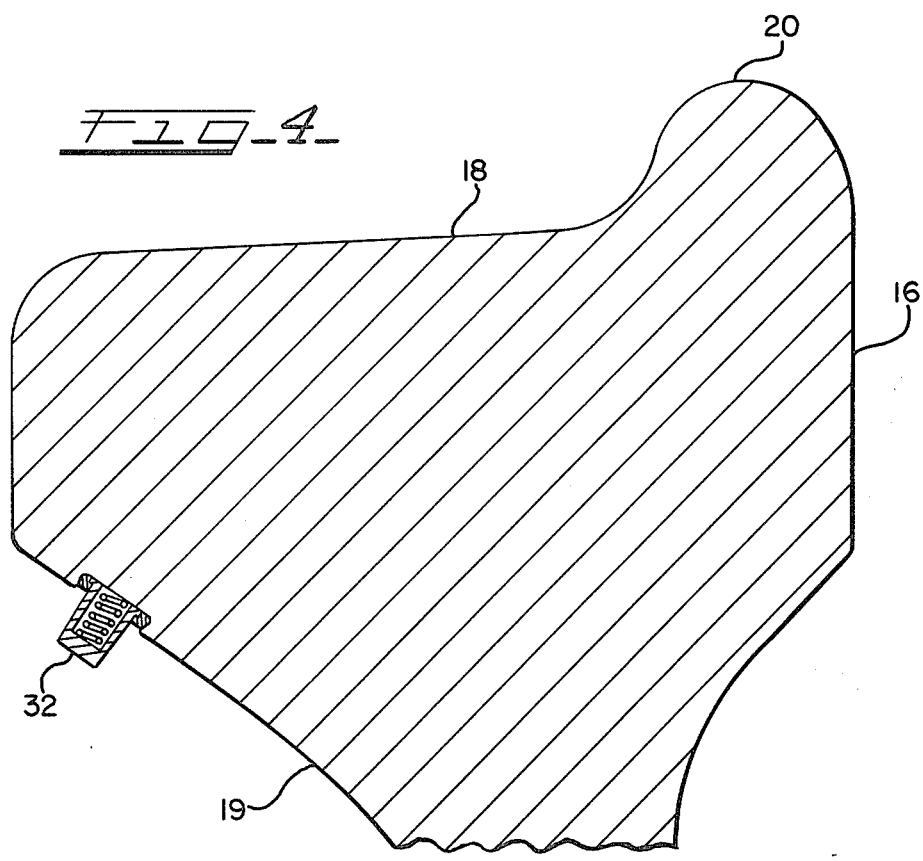

THERMAL MONITOR FOR RAILROAD WHEELS

BACKGROUND OF THE INVENTION

This invention relates to a thermal monitoring device for railway wheels, and, more particularly, a device that will be released from the railway wheel when it overheats during operation. This allows, upon subsequent examination, the easy discovery that the wheel has been overheating.

A considerable amount of effort has been expended in an attempt by the railroad industry to produce, economically, a thermal monitoring device that would provide an inexpensive yet reliable method of discovering when a railway wheel is overheating in service. It has been found that stress cracks in the plate portion of the wheel are caused primarily by repeated brake applications during which large amounts of heat are generated by the frictional contact of the brake shoes on the wheel rim. The temperature rise in the wheel rim causes it to expand in a radial direction and this expansion creates highly concentrated stress patterns in the plate portion of the wheel. These high-stress areas are likely to develop cracks which continually expand with repeated brake applications. The ultimate result when this occurs is early wheel failure.

Accordingly, it is desirable to monitor the thermal loading of a railway wheel by locating indicators in regions of the wheel experiencing large thermal gradients such as the rim and rim fillet. Such prior efforts have included attaching heat sensitive strips to the fillet regions near the rim. This has proved unsuccessful due to the problems encountered in keeping the strip attached to the wheel for extended periods of service. The use of thermal paints has proved unsuccessful due to their concealment by grease and road grit.

It therefore is an object of the present invention to provide an inexpensive yet reliable device for monitoring the thermal condition of a railway wheel while in service.

SUMMARY OF THE INVENTION

The present invention provides a device for the thermal monitoring of a railway wheel while in service. An insert is placed in a cavity in the wheel plate near the rim. The insert is comprised of a material chosen such that upon the overheating of the wheel, the insert will be discharged from the cavity in the wheel plate. A subsequent inspection of the wheel will readily indicate that the wheel has been overheating during operation.

The concept of placing a cavity in a wheel and filling the cavity with a material to monitor critical wheel temperatures during operation has proved superior to prior methods. The fact that the material actually melts to evacuate the cavity completely when the wheel has been subjected to overheating provides a positive guide to enable maintenance personnel to readily observe that the wheel has been overheating. The fact that the cavity is empty indicates that the wheel has been overheated; no interpretation of thermal paint colors during operation is required. Studies have shown that the thermal indicator will not dislodge for causes other than overheating, but as a check, two or three indicators can be installed per wheel. If the wheel is actually overheating, all the indicators will have been dislodged.

The heat transfer from the wheel to the indicator is direct, as the indicator is actually installed in a small cavity in the wheel. There is minimal change in the wheel's mechanical or physical properties due to the presence of the cavity and indicator. This is especially true when two or three indicators are installed in a symmetrical pattern around the wheel.

Finally, the thermal indicator will provide an accurate monitoring over a long period of time, as the properties such as melting point of the insert will not change with time.

BRIEF DESCRIPTION OF THE DRAWINGS

In the drawings,

FIG. 1 is a side view of a railway wheel showing preferred locations for monitoring devices.

FIG. 2 is a partial cross-sectional view of a fillet section of a railway wheel taken along A—A of FIG. 1 having one of the thermal monitoring devices installed therein;

FIG. 3 is a side view of the thermal monitoring device shown installed in FIG. 2;

FIG. 4 is a partial cross-sectional view of a fillet section of a railway wheel taken along A—A of FIG. 1 having another of the thermal monitoring devices installed therein;

FIG. 5 is a side cross sectional view of the thermal monitoring device shown installed in FIG. 4;

DETAILED DESCRIPTION OF THE PREFERRED EMBODIMENTS

Referring to FIG. 1, there is shown a cast steel railway wheel comprising a hub portion 10 having located centrally thereof a transverse bore 12 arranged to receive one end of an axle (not shown) in a conventional manner. Formed integrally with hub 10 and extending generally radially thereof is a plate portion indicated generally at 14. A rim 16 is peripherally formed at the radially outer edge of the plate 14 and comprises a tread surface 18 and a flange 20 extending radially outward of the tread surface 18 on the inboard side of the wheel and fillet surface 19.

Further indicated are three cavities 22 in fillet surface 19, which are better seen in FIGS. 2 and 4. The preferred number of cavities in three, as one cavity may be hidden by the car frame structure when the wheel is installed. As seen in FIG. 2, cavity 22 has an inner lip 24 of greater diameter than the outer opening. Cavity 22 is preferably formed in outboard side of the wheel during the casting operation by modifying the mold as required. However, the cavity may also be formed by maching operations in an already manufactured wheel. Generally, the diameter of the cavity is about 0.5 inch (1.27 cm).

One embodiment of the present invention is shown in FIG. 2. The derby shaped insert 26 is shown in FIG. 3. Insert 26 usually is comprised essentially of lead. During installation, Insert 26 is placed in cavity 22 and then struck with a tool which contacts only the edges 28 of the insert to expand the flange portion of insert 26 to fit within cavity 22 and cavity inner lip 24. This prevents the removal of insert 26 during normal operation. During normal operation, the head of insert 26 extends out beyond the fillet surface 19. This permits ready determination that the insert has not been released. In the event of the overheating of the wheel in operation, insert 26 will melt and leave cavity 22 empty. Because of the raised shape of insert 26, the empty cavity will be a ready indication to maintenance personnel that the wheel has been subjected to overheating. The melting of insert 26, is made of lead, will generally occur at about 620° F. (327° C.), although any desired value can be obtained by the alloying of the insert as desired.

Referring now to FIGS. 4 and 5, another embodiment of the present invention is shown. Cavity 22 is identical to that shown in FIG. 2, but insert 30 differs from insert 26. Insert 30 is comprised of a cap portion 32, a compression spring 34, and a washer 36. During installation, washer 36 is fitted within cavity 22 and expanded into inner lip 24 by hammering about its edge with a tool so designed as to strike only washer 36. During normal operation, the top of cap 32 will extend beyond fillet surface 19. This permits ready determination that the insert has not been released. Washer 36 is usually comprised of lead, and when the wheel is subjected to overheating in operation, washer 36 will melt, allowing compression spring 34 to extend thereby ejecting cap 32 and spring 34 from cavity 22. Because of the raised shape of cap 32, the empty cavity will be a ready indication to maintenance personnel that the wheel has been subjected to overheating. If washer 36 is comprised of lead, the melting will generally occur at about 620° F. (327° C.), although any desired value can be obtained by the alloying of the washer as desired.

It will be understood that, while preferred embodiments have been described, the scope of the present invention is to be determined by the following claims.

What is claimed:

1. A railway wheel comprising a hub, a rim and a plate portion extending generally radially from said hub to said rim, further comprising at least one annular cavity means having a bottom inner lip portion and an outer top in said plate portion near said rim, the bottom portion of the cavity means being of a greater diameter than the outer top portion, and temperature monitoring means located in said cavity means, said temperature monitoring means comprising a rim means and a cap means, said rim means being expanded during insertion within said cavity means to hold said temperature monitoring means in direct contact with said cavity means, said cap means extending outward beyond said cavity means during normal operation to readily indicate that said railway wheel has not been subjected to overheating during operation, and said temperature monitoring means evacuating from said cavity means by the melting of said rim means, thus leaving said cavity means empty to readily indicate that said railway wheel has been subjected to overheating during operation.

2. In the railway wheel of claim 1 wherein said temperature monitoring means comprises a metal plug.

3. In the railway wheel of claim 1, wherein said rim means of the temperature monitoring means and the cap means are separate and includes a spring provided within said cap means, the rim means in the form of a washer fitted around said cap means 5 said cap means and said spring being ejected from said cavity means upon melting of said rim means.

* * * * *